United States Patent
Medalsy

(10) Patent No.: US 12,005,634 B2
(45) Date of Patent: Jun. 11, 2024

(54) Methods For Photocuring Liquid Resin With Reduced Heat Generation

(71) Applicant: NEXA3D INC., Ventura, CA (US)

(72) Inventor: Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 0 days.

(21) Appl. No.: 17/649,050

(22) Filed: Jan. 26, 2022

(65) Prior Publication Data

US 2022/0266508 A1    Aug. 25, 2022

Related U.S. Application Data

(60) Provisional application No. 63/200,258, filed on Feb. 24, 2021.

(51) Int. Cl.
*B29C 64/135*        (2017.01)
*B29C 64/232*        (2017.01)
(Continued)

(52) U.S. Cl.
CPC .......... *B29C 64/135* (2017.08); *B29C 64/232* (2017.08); *B29C 64/245* (2017.08);
(Continued)

(58) Field of Classification Search
CPC ... B29C 64/135; B29C 64/232; B29C 64/245; B29C 64/268; B29C 64/286;
(Continued)

(56) References Cited

U.S. PATENT DOCUMENTS

| 7,095,541 B2 | 8/2006 | Liu |
| 10,408,390 B2 | 9/2019 | Minor et al. |

(Continued)

FOREIGN PATENT DOCUMENTS

JP    H071593 A    1/1995

OTHER PUBLICATIONS

Bertsch; et al., "Microstereophotolithography using a liquid crystal display as dynamic mask-generator", Microsystem Technologies (1997), pp. 42-47.
(Continued)

*Primary Examiner* — Seyed Masoud Malekzadeh
*Assistant Examiner* — Xinwen Ye
(74) *Attorney, Agent, or Firm* — Ascenda Law Group, PC

(57) ABSTRACT

In a vat polymerization printer, a beam scanner scans a light beam across a mask and into a tank containing a photocurable resin. The mask has pixels configurable to be individually transparent or opaque to portions of the light beam, which has a diameter greater than a cross-sectional dimension of the pixels of the mask. During an exposure time duration, a first subset of the pixels are controlled to be transparent at locations corresponding to the cross section of a three-dimensional object to be printed, while a second subset of the pixels are controlled to be opaque at locations not corresponding to the cross section of the three-dimensional object. The beam scanner is controlled to scan the light beam across the mask such that the light beam is always incident on at least one of the pixels of the mask that are controlled to be transparent.

3 Claims, 17 Drawing Sheets

(51) Int. Cl.
  B29C 64/245 (2017.01)
  B29C 64/268 (2017.01)
  B29C 64/286 (2017.01)
  B29C 64/393 (2017.01)
  B33Y 10/00 (2015.01)
  B33Y 30/00 (2015.01)
  B33Y 50/02 (2015.01)
  G02F 1/31 (2006.01)

(52) U.S. Cl.
  CPC .......... B29C 64/268 (2017.08); B29C 64/286 (2017.08); B29C 64/393 (2017.08); B33Y 10/00 (2014.12); B33Y 30/00 (2014.12); B33Y 50/02 (2014.12); G02F 1/31 (2013.01)

(58) Field of Classification Search
  CPC ..... B29C 64/393; B29C 64/129; B33Y 30/00; B33Y 10/00; B33Y 50/02; G02F 1/31
  See application file for complete search history.

(56) References Cited

U.S. PATENT DOCUMENTS

2016/0221267 A1\* 8/2016 John .................... B29C 64/129
2016/0243649 A1  8/2016 Zheng et al.
2017/0219855 A1  8/2017 Demuth et al.
2018/0056590 A1\* 3/2018 Costabeber ............ B33Y 50/02
2019/0344504 A1\* 11/2019 Barlow ................ B29C 64/277
2020/0338830 A1  10/2020 Deetz et al.

OTHER PUBLICATIONS

Farsari; et al., "Microfabrication by use of a spatial light modulator in the ultraviolet: experimental results", Optics Letters, Apr. 15, 1999, 24(8):549-550.

Fiedor; et al., "A New Approach to Micromachining: High-Precision and Innovative Additive Manufacturing Solutions Based on Photopolymerization Technology", Materials (2020), 13:2951, 25 pgs.

Limaye, "Design and Analysis of a Mask Projection Microstereolithography System", Thesis, Nov. 2004, Georgia Institute of Technology, 197 pgs.

Obata; et al., "Multi-focus two-photon polymerization technique based on individually controlled phase modulation", Optics Express, Aug. 2, 2010, 18(16):17193-17200.

International Preliminary Report on Patentability mailed Jan. 10, 2023, from the IPEA/European Patent Office, for International Patent Application No. PCT/US2022/013933 (filed Jan. 26, 2022), 20 pgs.

International Search Report and Written Opinion mailed Apr. 7, 2022, from the ISA/European Patent Office, for International Patent Application No. PCT/US2022/013933 (filed Jan. 26, 2022), 17 pgs.

\* cited by examiner

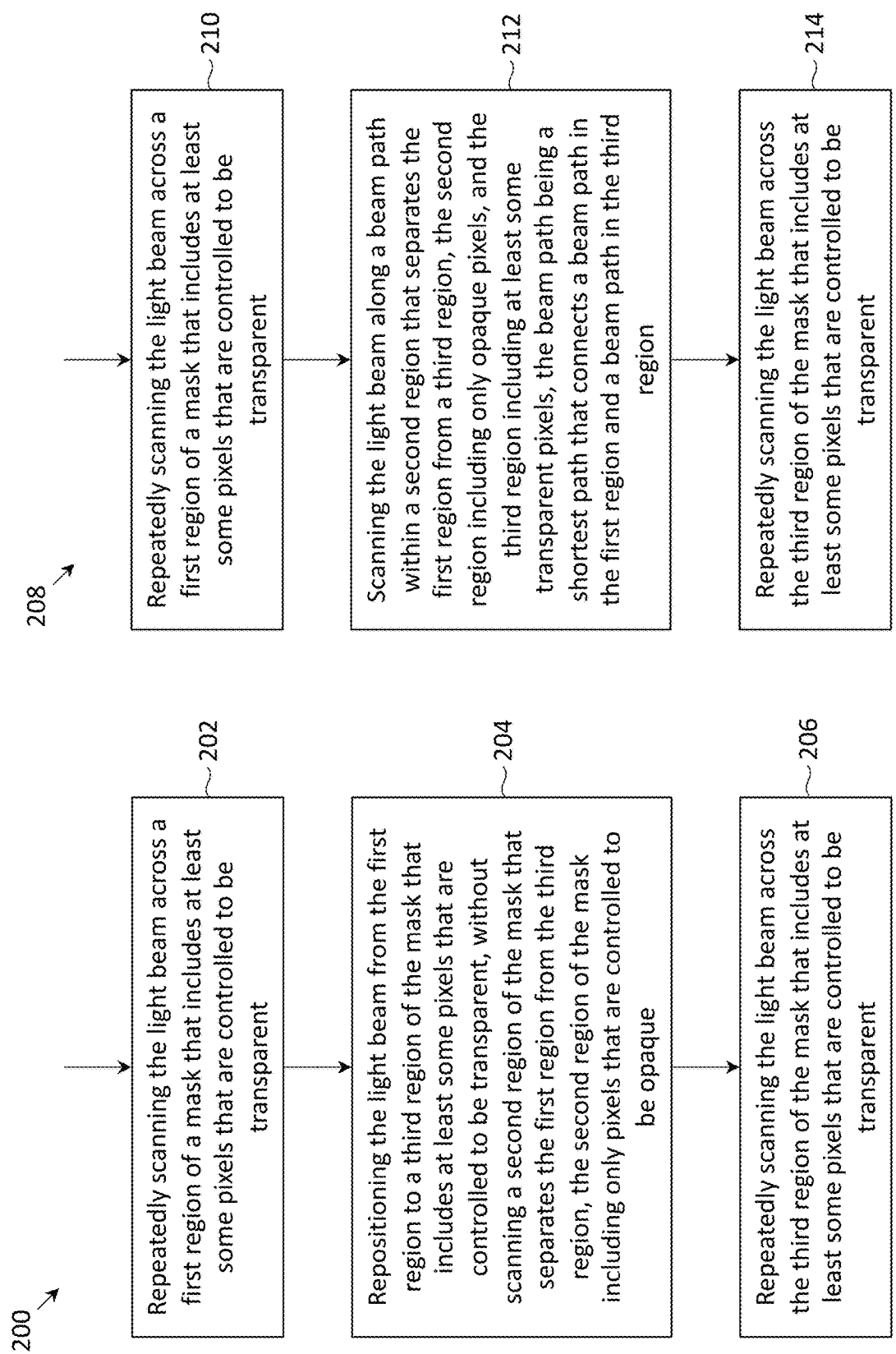

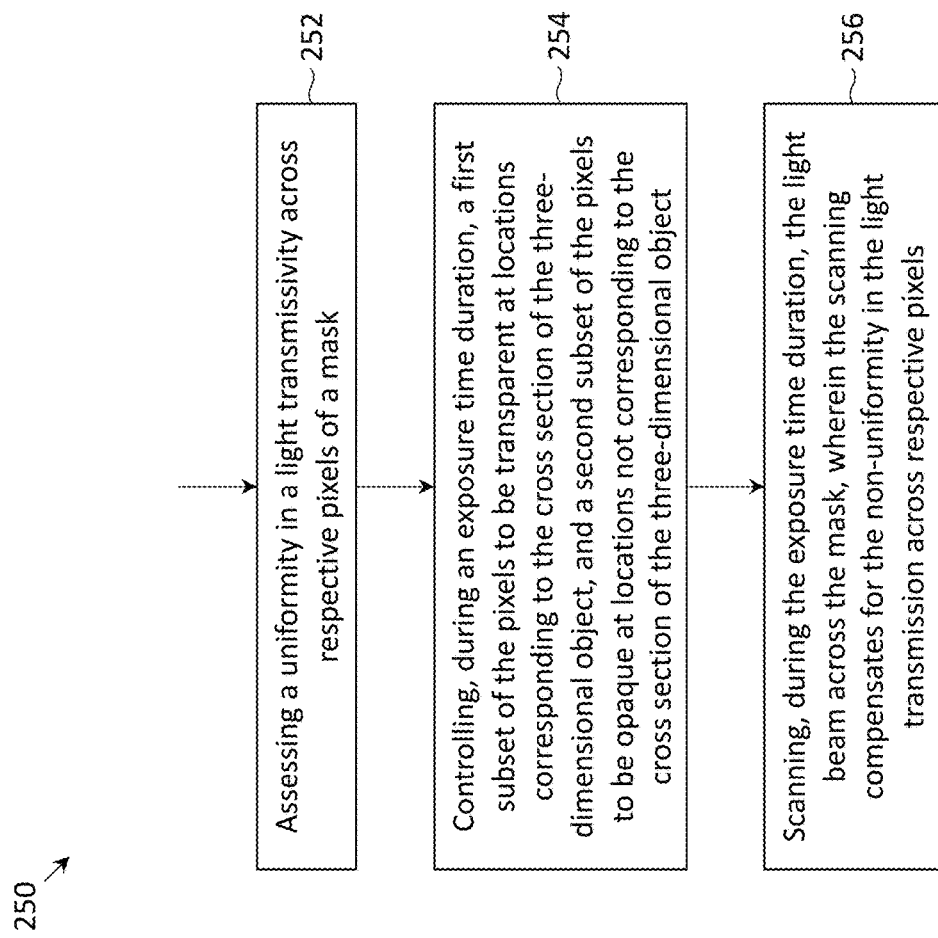

Methods For Photocuring Liquid Resin With Reduced Heat Generation

RELATED APPLICATIONS

This is a NONPROVISIONAL of, claims priority to, and incorporates by reference U.S. Provisional Application No. 63/200,258, filed 24 Feb. 2021.

FIELD OF THE INVENTION

The present invention relates to the printing of three-dimensional objects by photo-curing a liquid resin, and more particularly relates to reducing heat imparted into the liquid resin by a light source.

BACKGROUND

One obstacle encountered in the three-dimensional printing of objects that involves the curing of photo-curable liquid resin is the heating of the liquid resin. Not only is the curing of photo-curable liquid resin an exothermic reaction (which locally heats regions of the photo-curable liquid resin where the curing takes place), but the irradiation of a mask by a light source, typically an ultra-violet (UV) light source, also causes heating of the mask. As the mask is located in close proximity to the liquid resin, any heating of the mask also leads to the further heating of the photo-curable liquid resin.

If the liquid resin temperature exceeds a critical temperature, portions of the resin may start to cure even in the absence of UV light, leading to defects in the printed objects. In prior approaches to prevent the liquid resin temperature from exceeding this critical temperature, the printing process may be periodically halted to allow the photo-curable liquid resin to cool, with the consequence of reducing the throughput of the printing process. Also in prior approaches, a resin circulatory system may be employed to cool the heated resin. While heat removal via a resin circulatory system may effectively achieve the desired effect of controlling the liquid resin temperature, approaches described herein control the temperature of the liquid resin through other or additional means.

SUMMARY OF THE INVENTION

In one embodiment of the present invention, a vat polymerization printer includes a tank configured for containing a photo-curable liquid resin, a light source configured to emit a light beam, and a mask positioned between the light source and the tank and having pixels configurable to be individually transparent or opaque to portions of the light beam. Preferably, a diameter of a cross section of the light beam is greater than a cross-sectional dimension of each of the respective pixels. A beam scanner is configured to scan the light beam across the mask, and a processor operating under stored processor-executable instructions controls the vat polymerization printer to print a cross section of a three-dimensional object by: controlling, during an exposure time duration, a first subset of the pixels to be transparent at locations corresponding to the cross section of the three-dimensional object, and a second subset of the pixels to be opaque at locations not corresponding to the cross section of the three-dimensional object; and controlling, during the exposure time duration, the beam scanner to scan the light beam across the mask such that the light beam is always incident on at least one of the pixels of the mask that are controlled to be transparent.

In various embodiments, the diameter of the cross section of the light beam may be at least ten times or at least a hundred times the cross-sectional dimension of each of the respective pixels of the mask. Further, the light source may include a laser source configured to emit a laser beam; and a beam expander configured to generate the light beam from the laser beam, wherein the diameter of the cross section of the light beam is greater than a diameter of a cross section of the laser beam.

In various embodiments, the processor-executable instructions may further cause the processor to determine a scan path for the light beam based on respective locations of the pixels that are controlled to be transparent during the exposure time duration. Also, during the exposure time duration, the processor-executable instructions may further cause the processor to turn off the light source while the beam scanner repositions the light beam between a first region of the mask that includes at least some pixels that are controlled to be transparent to a third region of the mask that includes at least some pixels that are controlled to be transparent, the third region of the mask being separate from the first region of the mask by a second region of the mask that includes only pixels that are controlled to be opaque. And, in still further embodiments, the processor-executable instructions may further cause the processor to control a blocking element to block the light beam while the beam scanner repositions the light beam from a first region of the mask that includes at least some pixels that are controlled to be transparent to the third region of the mask. In the various embodiments, the pixels may be electrically modulated liquid crystal pixel elements.

In various embodiments, the vat polymerization printer may further include a transparent backing member disposed between the mask and a flexible membrane. Additionally, an extraction plate may be disposed within the tank, and during printing the three-dimensional object formed from cured portions of the photo-curing liquid resin is affixed to the extraction plate. A height adjustor may be configured to control a vertical position of the extraction plate above the mask.

Other embodiments of the invention provide a vat polymerization printer that includes a tank configured for containing a photo-curable liquid resin, a light source configured to emit a light beam, and a mask having pixels configurable to be individually transparent or opaque to portions of the light beam. A diameter of a cross section of the light beam is greater than a cross-sectional dimension of each of the respective pixels and a beam scanner is configured to scan the light beam across the mask. A processor of a controller executes instructions to control the vat polymerization printer to print a cross section of a three-dimensional object by controlling, during an exposure time duration, a first subset of the pixels to be transparent at locations corresponding to the cross section of the three-dimensional object, and a second subset of the pixels to be opaque at locations not corresponding to the cross section of the three-dimensional object; and controlling, during the exposure time duration, the beam scanner to scan the light beam across at least one region of the mask having pixels that are controlled to be transparent, wherein at most ten percent of the pixels that are controlled to be opaque are scanned by the light beam during the printing of the cross section of the three-dimensional object.

In various embodiments, the processor of the controller may further execute instructions to control the beam scanner to repeatedly scan the light beam across a first region of the mask that includes at least some pixels that are controlled to be transparent, followed by controlling the beam scanner to scan the light beam along a beam path within a second region that separates the first region from a third region, the second region including only pixels that are controlled to be opaque, and the third region including at least some pixels that are controlled to be transparent, and the beam path within the second region being a shortest path that connects a beam path in the first region and a beam path in the third region, and followed by controlling the beam scanner to repeatedly scan the light beam across the third region of the mask. Repeatedly scanning the light beam across the first region of the mask comprises at least one of a raster scan or a back and forth scan of the first region of the mask, and repeatedly scanning the light beam across the third region of the mask comprises at least one of a raster scan or a back and forth scan of the third region of the mask.

Another embodiment of the invention provides for printing a cross section of a three-dimensional object in a photocuring region of a vat polymerization printer that includes (i) a tank configured for containing a photo-curable liquid resin, (ii) a flexible membrane defining a bottom boundary of the photocuring region, (iii) a light source configured to emit a light beam, (iv) a beam scanner configured to scan the light beam, and (v) a mask disposed between the beam scanner and the flexible membrane and having pixels configurable to be individually transparent or opaque to portions of the light beam, wherein a diameter of a cross section of the light beam is greater than a cross-sectional dimension of each of the respective pixels. According to the printing process, during an exposure time duration a first subset of the pixels are controlled to be transparent at locations corresponding to the cross section of the three-dimensional object, a second subset of the pixels are controlled to be opaque at locations not corresponding to the cross section of the three-dimensional object, and the light beam is scanned across at least one region of the mask having at least some pixels that are controlled to be transparent and into the photocuring region, wherein at most ten percent of the pixels that are controlled to be opaque are scanned by the light beam during the printing of the cross section of the three-dimensional object.

In this printing process, during the exposure time duration, and as a result of the control of the first and second subset of the pixels, a first region of the mask includes at least some pixels that are controlled to be transparent, a second region of the mask includes only pixels that are controlled to be opaque, and a third region of the mask includes at least some pixels that are controlled to be transparent, and the scanning of the light beam comprises repeatedly scanning the light beam across the first region of the mask and into the photocuring region through pixels in the first region that are controlled to be transparent, followed by scanning the light beam along a shortest path, within the second region, that connects a beam path in the first region and a beam path in the third region, and followed by repeatedly scanning the light beam across the third region of the mask and into the photocuring region through pixels in the third region that are controlled to be transparent. Repeatedly scanning the light beam across the first region of the mask comprises at least one of a raster scan or a back and forth scan of the first region of the mask, and wherein repeatedly scanning the light beam across the third region of the mask comprises at least one of a raster scan or a back and forth scan of the third region of the mask.

Alternatively, or in addition, during the exposure time duration, and as a result of the control of first and second subset of the pixels, a first region of the mask includes at least some pixels that are controlled to be transparent, a second region of the mask includes only pixels that are controlled to be opaque, and a third region of the mask includes at least some pixels that are controlled to be transparent, and the scanning of the light beam comprises repeatedly scanning the light beam across the first region of the mask and into the photocuring region through pixels of the first region that are controlled to be transparent, repositioning the light beam from the first region of the mask to the third region of the mask without scanning the second region of the mask, and repeatedly scanning the light beam across the third region of the mask and into the photocuring region through pixels of the third region that are controlled to be transparent. Repeatedly scanning the light beam across the first region of the mask comprises at least one of a raster scan or a back and forth scan of the first region of the mask, and wherein repeatedly scanning the light beam across the third region of the mask comprises at least one of a raster scan or a back and forth scan of the third region of the mask.

During the exposure time duration of the printing process, a total number of pixels in the first subset of the pixels may be less than a total number of pixels in the second subset of the pixels.

Still another embodiment of the invention provides for printing a cross section of a three-dimensional object in a photocuring region of a vat polymerization printer that includes (i) a tank configured for containing a photo-curable liquid resin, (ii) a flexible membrane defining a bottom boundary of the photocuring region, (iii) a light source configured to emit a light beam, (iv) a beam scanner configured to scan the light beam, and (v) a mask disposed between the beam scanner and the flexible membrane and having pixels configurable to be individually transparent or opaque to portions of the light beam, wherein a diameter of a cross section of the light beam is greater than a cross-sectional dimension of each of the respective pixels. The process includes controlling, during an exposure time duration, a first subset of the pixels to be transparent at locations corresponding to the cross section of the three-dimensional object, and a second subset of the pixels to be opaque at locations not corresponding to the cross section of the three-dimensional object; and scanning, during the exposure time duration, the light beam across at least one region of the mask having at least some pixels that are controlled to be transparent and into the photocuring region, wherein the scanning compensates for a non-uniformity in a light transmission across respective pixels in the at least one region of the mask by at least one of: (i) varying a light intensity of the light beam while the light beam is scanned over the at least one region, (ii) varying a scan speed of the light beam while the light beam is scanned over the at least one region, or (iii) varying a number of times the light beam is repeatedly scanned over the at least one region.

These and further embodiments of the present invention are described more fully below.

BRIEF DESCRIPTION OF THE DRAWINGS

The invention is now described, by way of example and without limiting the scope of the invention, with reference to the accompanying drawings which illustrate embodiments of it, in which:

FIG. 13A depicts a flow chart of a method to scan a light beam across a surface of a mask of a 3D printing system, in accordance with one embodiment of the invention.

FIG. 13B depicts a flow chart of another method to scan a light beam across a surface of a mask of a 3D printing system, in accordance with one embodiment of the invention.

FIG. 14 depicts a flow chart of a method to print a cross section of a three-dimensional object with reduced heat generation, and to further compensate, during the printing, for the non-uniformity in the light transmissivity across respective pixels of a mask of a 3D printing system, in accordance with one embodiment of the invention.

DETAILED DESCRIPTION

In the following detailed description of embodiments of the invention, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

In one embodiment of the invention, the need to cool the liquid resin is reduced by reducing the degree to which the liquid resin is heated. While the heating of the liquid resin due to the exothermic reaction that takes place during the curing of resin cannot be avoided, the heating of the mask can be reduced by selectively illuminating only regions of the mask with transparent pixels and/or minimizing the illumination of the regions of the mask with opaque pixels. These and other embodiments of the invention are more fully described in association with the drawings below.

Figure 1:
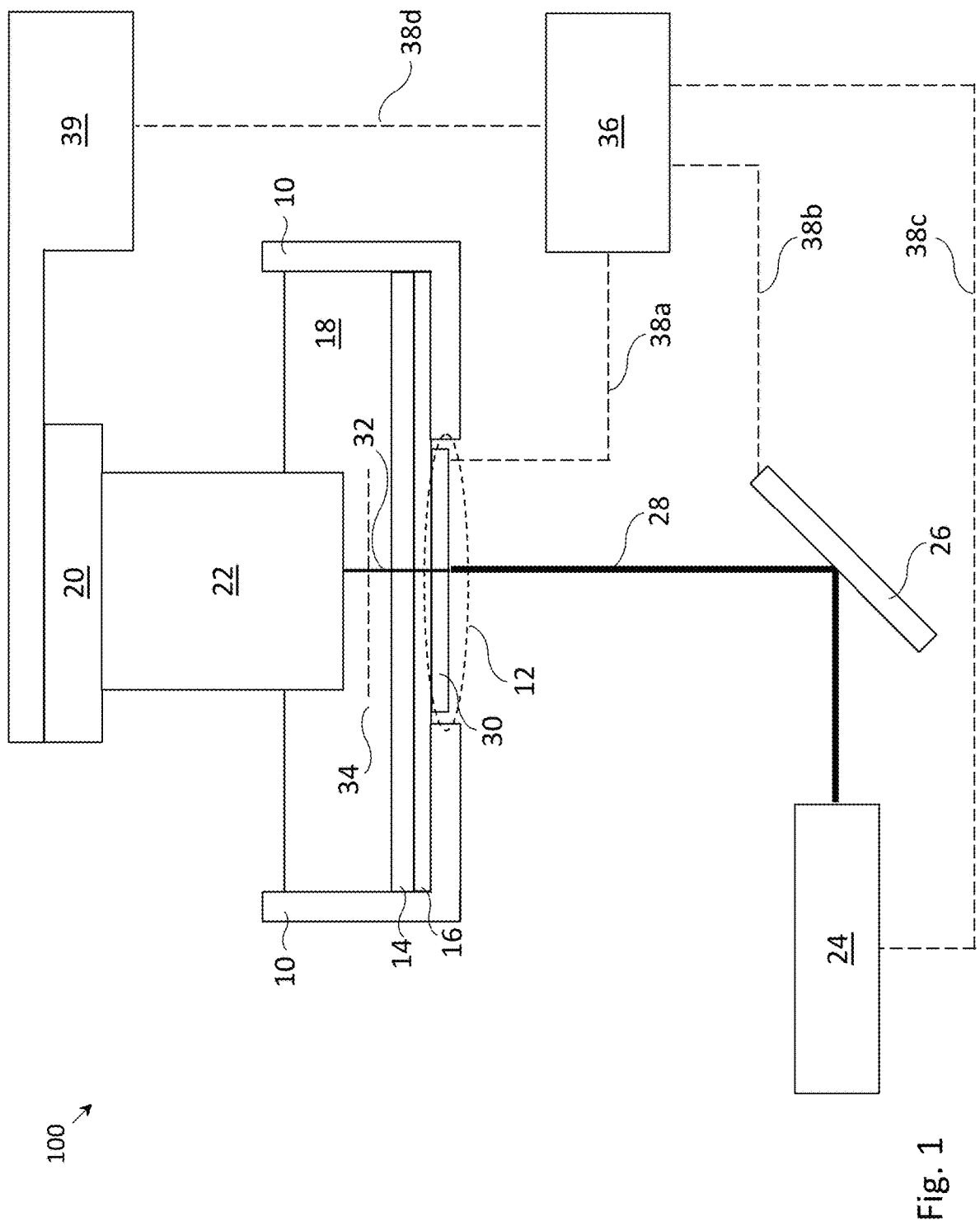
FIG. 1 depicts a cross-section of a three-dimensional (3D) printing system, in accordance with one embodiment of the invention.

FIG. 1 depicts a cross-section of a three-dimensional (3D) printing system 100 (also called a vat polymerization printer), in which electromagnetic radiation (e.g., ultraviolet light) is used to cure photo-curable liquid resin 18 in order to fabricate object 22 (e.g., a 3D object). Object 22 may be fabricated layer by layer; that is, a new layer of object 22 may be formed by photo-curing a layer 34 of liquid resin 18 adjacent to the bottom surface of object 22, the object may be raised by extractor plate 20, allowing a new layer of photo-curing liquid resin 18 to be drawn under the newly formed layer; and the process repeated to form additional layers.

The 3D printing system 100 includes tank 10 for containing the photo-curable liquid resin 18. The bottom of tank 10 includes a bottom opening 12 to allow electromagnetic radiation (e.g., filtered light beam 32) from light source 24 to enter into tank 10. An optional radiation-transparent backing member 16 (e.g., borosilicate glass or a toughened glass such as an alkali-aluminosilicate glass of approximately 100 μm thickness) may be used to seal the tank opening 12 (i.e., to prevent the photo-curing liquid polymer 18 from leaking out of tank 10), while at the same time, allowing electromagnetic radiation to enter into tank 10 in order to cure the liquid polymer.

One challenge faced by 3D printing systems of the present kind is that in addition to adhering to the object 22, newly formed layers tend to adhere to the bottom of tank. Consequently, when the extraction plate 20 to which the object is attached is raised by height adjustor 39, the newly formed layer could tear and/or become dissociated from the object 22. To address this issue, a flexible membrane 14 may be disposed adjacent to backing member 16 (if present) or may form the bottom of the tank (if no backing member is used). Flexible membrane 14 may be formed of silicone or another material, and optionally, coated with a non-stick material such as polytetrafluoroethylene (PTFE) to reduce the likelihood for the newly formed layer to adhere to the bottom of tank 10. The flexible membrane 14 is transparent (or nearly so) to the wavelength of radiation emitted by the light source 24 so as to allow that radiation to enter into tank 10 in order to cure the liquid polymer 18.

A mask 30 may be disposed to spatially filter the radiation that is incident on layer 34, so that specific regions of the liquid resin 18, that correspond to the cross section of the object 22 being printed, are cured. Mask 30 may be a transmissive spatial light modulator, such as a liquid crystal display (LCD) with a two-dimensional array of addressable pixels. As will be more clearly described below, certain ones of the pixels of the mask may be controlled to be transparent, while others may be controlled to be opaque. Transparent pixels allow radiation to pass through the mask 30 at certain spatial locations of mask 30 and into tank 10, consequently curing corresponding portions (voxels) of the liquid resin 18, while opaque pixels prevent radiation from passing through certain spatial locations of mask 30, thereby avoiding curing of corresponding portions (voxels) of the liquid resin 18.

A beam scanner 26 may scan light beam 28 across mask 30. As will be described in more detail below, beam scanner 26 may be controlled by controller 36 to selectively scan light beam 28 across regions of mask 30 with transparent pixels, while substantially avoiding regions of mask 30 with only opaque pixels. Beam scanner 26 may be an x-y scanner, such as a galvo scanner (also known as a galvanometer scanner). In a preferred embodiment (although not depicted in FIG. 1), the distance separating beam scanner 26 from mask 30 is substantially greater than the lateral dimensions of mask 30 so that light beam 28 is incident upon mask 30 at substantially 90° regardless of whether light beam 28 is scanning peripheral regions of mask 30 or central regions of mask 30. Such placement of the beam scanner 26 relative to the mask 30, along with a minimal separation between mask 30 and resin layer 34 decrease the effects of diffraction as light passes through mask 30, thereby increasing the accuracy to which object 22 can be printed.

Controller 36 may be communicatively coupled to mask 30, beam scanner 26, light source 24 and height adjustor 39 via control signal paths 38a, 38b, 38c and 38d, respectively (e.g., electrical signal paths). Controller 36 may control the addressable pixels of mask 30 such that the transparent pixels of mask 30 correspond to a cross section of an object to be printed (e.g., a layer of that object). Controller 36 may control beam scanner 26 to selectively scan a light beam across regions of mask 30 with transparent pixels, while substantially avoiding regions of mask 30 with only opaque pixels. Often times, the transparent pixels only account for a portion of the total pixels (e.g., 30%, 50%, etc.). Assuming those transparent pixels are aggregated in certain regions (which is often the case), only those regions of the mask are scanned, which substantially reduces the number of opaque pixels that are irradiated unnecessarily, in turn reducing the heating of mask 30 and resin 18. Specific examples of the scanning of light beam 28 will be provided below.

Controller 36 may also control light source 24. For instance, to further reduce the heating of mask 30, controller 36 may turn off light source 24 while light beam 28 is being repositioned by scanner 26 from one region of mask 30 with transparent pixels to another region of mask 30 with transparent pixels. Controller 36 may also control height adjustor 39 to control the vertical position of height extractor 20, and consequently of object 22 that is affixed to height extractor 20.

Figure 2:
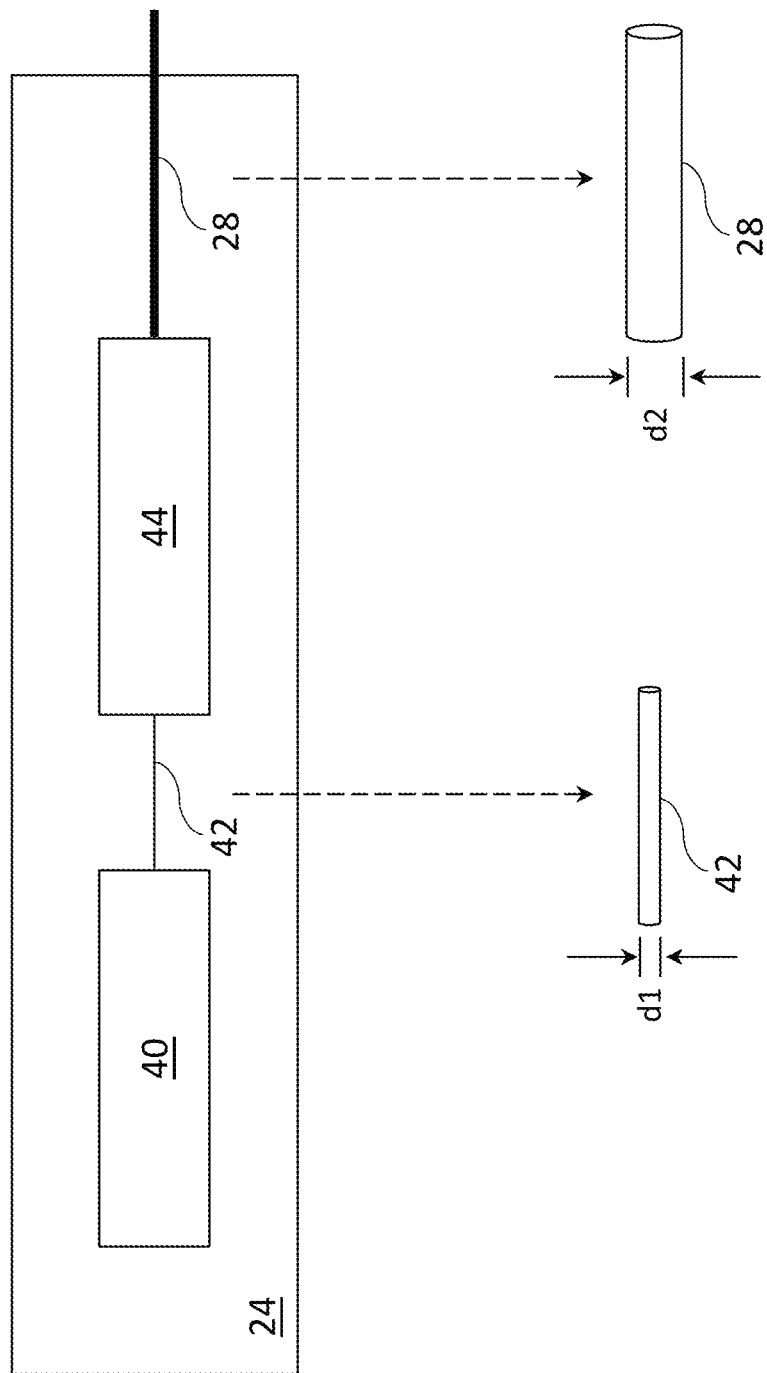
FIG. 2 depicts components of a light source, in accordance with one embodiment of the invention.

As depicted in FIG. 2, light source 24 may include laser source 40 that generates laser beam 42, and a beam expander 44 which transforms the collimated and focused laser beam 24 into a collimated and defocused light beam 28. For the sake of conciseness, collimated and defocused light beam 28 is simply referred to as "light beam" 28 throughout the description. As depicted in FIG. 2, a diameter, d2, of the cross section of light beam 28 may be larger than a diameter, d1, of the cross section of laser beam 42.

Figure 3A:
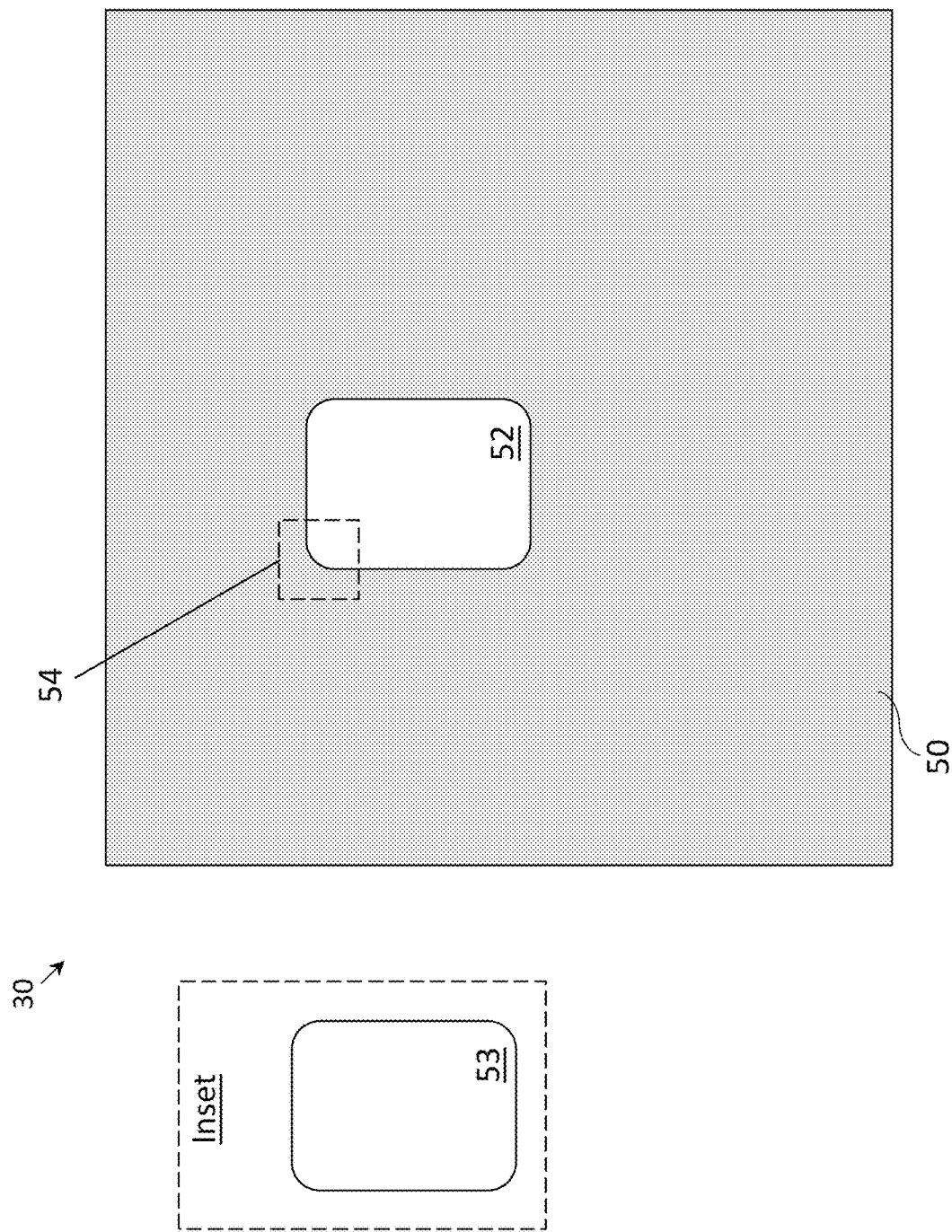
FIG. 3A depicts transparent and opaque regions of a mask, in accordance with one embodiment of the invention.

FIG. 3A depicts mask 30 during an exposure time duration, during which time, some pixels of mask 30 are controlled to be in a transparent state while other pixels of mask 30 are controlled to be in an opaque state (although mask 30 is not depicted at a level of detail in which the individual pixels are visible). For clarity of illustration, region 50 of mask 30 with opaque pixels is depicted with a gray shading, while region 52 of mask 30 with transparent pixels is depicted in white (i.e., without any shading). It is understood that a light beam scanning across mask 30 will pass through region 52 of the mask (and cure portions of layer 34 of liquid resin 18), while the light beam will not pass through region 50 of the mask. The shape of region 52 is chosen to approximately correspond to a cross section 53 of an object that is to be printed (see cross section 53 depicted as an inset in FIG. 3A). Typical dimensions of mask 30 (i.e., in the diagonal direction) may measure 13.3 inches, while it is contemplated that the dimensions of mask 30 will increase in the future, allowing for the printing of objects with larger dimensions.

Figure 3B:
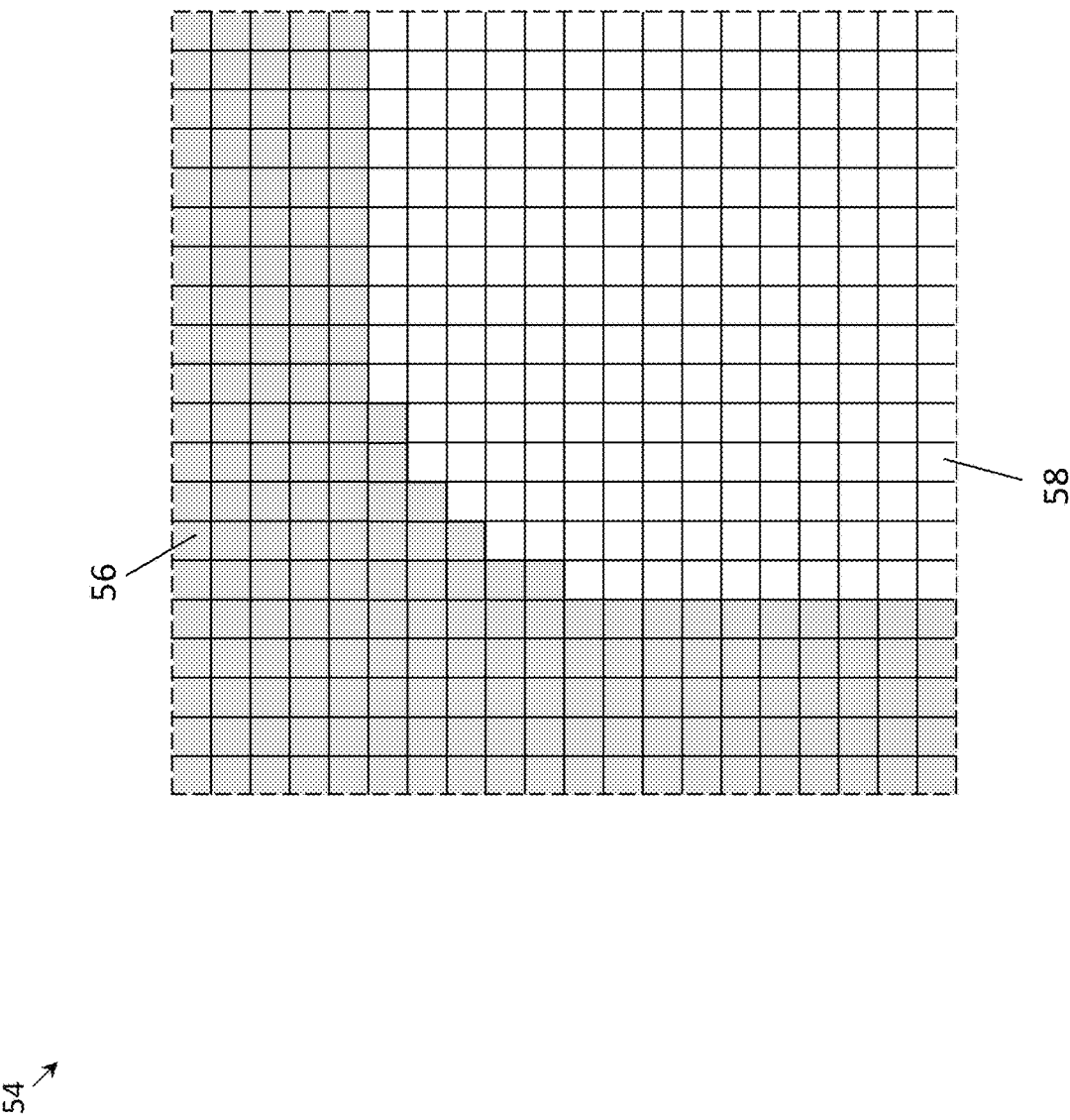
FIG. 3B depicts a magnified view of a portion of the mask depicted in FIG. 3A, in which individual transparent and opaque pixels are visible, in accordance with one embodiment of the invention.

FIG. 3B depicts a magnified view of portion 54 of the mask 30 depicted in FIG. 3A, in which individual pixels (e.g., electrically modulated liquid crystal pixel elements) are visible in the magnified view. Reference numeral 56 labels one of the opaque pixels, while reference numeral 58 labels one of the transparent pixels of mask 30. For clarity of illustration, opaque pixels are depicted in gray shading, while clear pixels are depicted in white (i.e., without any shading). It is understood that the visualization of pixels in FIG. 3B is merely a schematic illustration, and may not depict an actual representation thereof. For instance, pixels are depicted with square boundaries in FIG. 3B, but other boundary shapes are possible, such as a rectangular boundary, an oval boundary, a circular boundary, etc. The physical construction of a pixel (e.g., liquid crystal sandwiched between two electrodes) is well known in the art, and will not be discuss herein for the sake of conciseness.

Figure 4A:
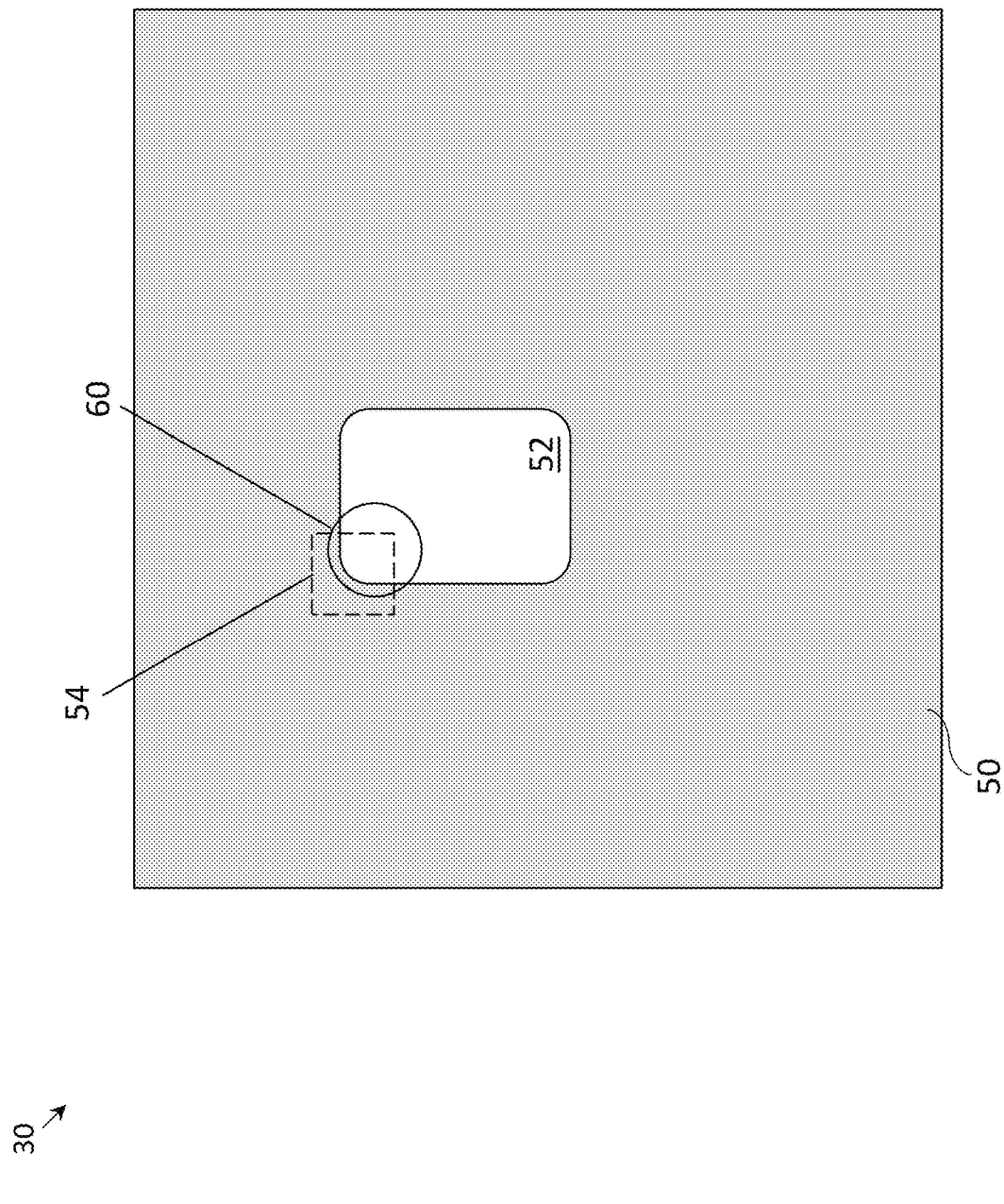
FIG. 4A depicts a beam spot of a light beam illuminating a portion of the mask depicted in FIG. 3A, in accordance with one embodiment of the invention.

FIG. 4A depicts cross section 60 of light beam 28 at the surface of mask 30. For conciseness of discussion, cross section 60 may be referred to as a "beam spot," but if the "illuminated" area of mask 30 comprises transparent pixels, it is understood that the "beam spot" may not actually be visible, as light beam 28 may shine through mask 30 without reflecting off of the surface of mask 30.

Figure 4B:
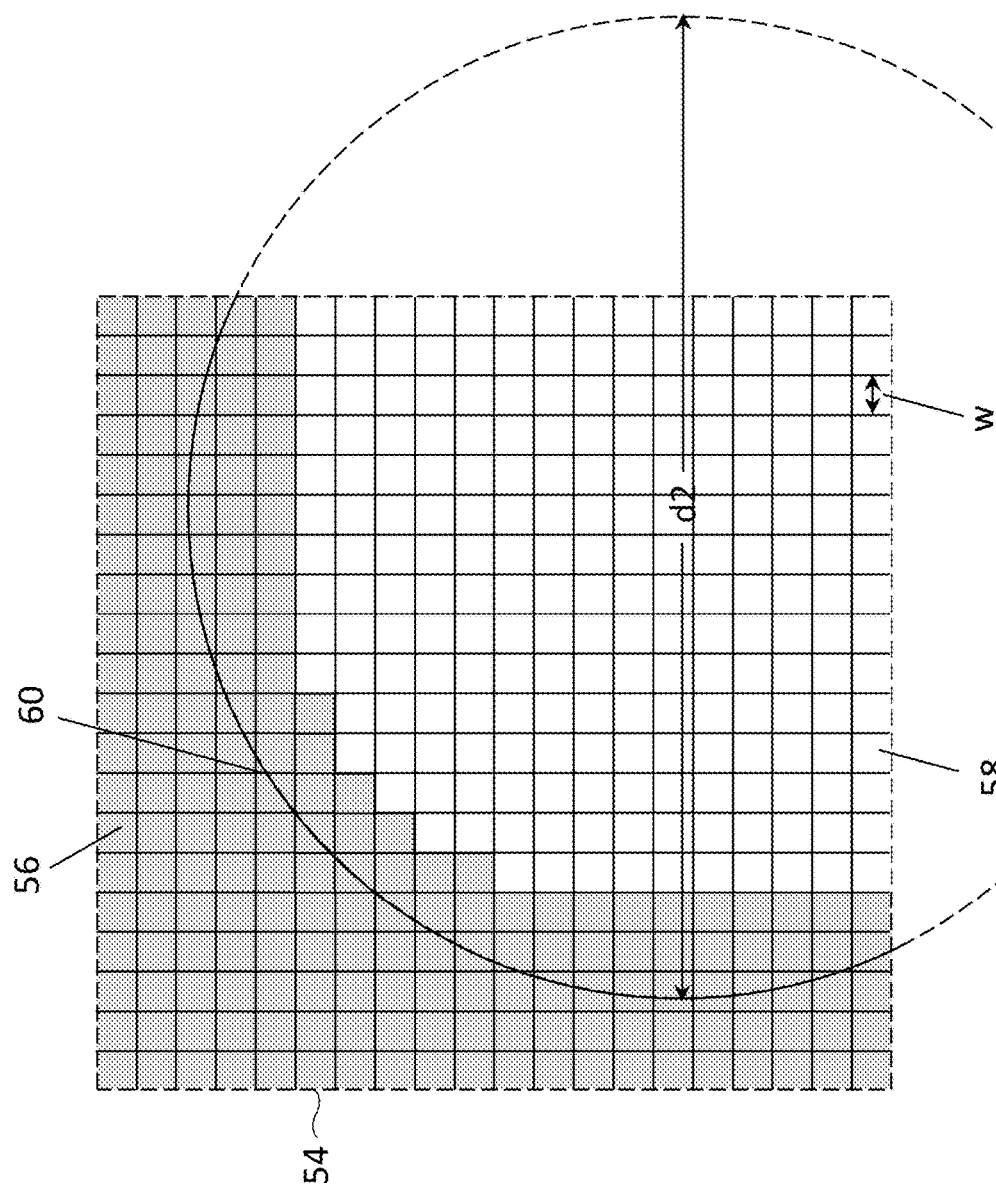
FIG. 4B depicts a magnified view of a portion of the mask and beam spot depicted in FIG. 3A, in which individual transparent and opaque pixels are visible, in accordance with one embodiment of the invention.

FIG. 4B depicts a magnified version of portion 54 of the mask 30 depicted in FIG. 3B. As shown in FIG. 4B, the diameter, d2, of beam spot 60 may be an order of magnitude (or more) greater than the cross sectional dimension, w, of each of the respective pixels. In one embodiment of the invention, the diameter, d2, is at least ten times the cross-sectional dimension, w, of each of the respective pixels. In another embodiment of the invention, the diameter, d2, is at least one hundred times the cross-sectional dimension, w, of each of the respective pixels. As an example, w may measure 25-150 μm, whereas d2 may measure 10 mm. In another embodiment of the invention, the diameter, d2, of beam spot 60 may be dynamically adjusted based on the cross-sectional dimensions of the object to be fabricated. If the cross-sectional dimensions of the object to be fabricated are on the order of centimeters, d2 may measure 1 centimeter. If the cross-sectional dimensions of the object to be fabricated are on the order of millimeters, d2 may measure 1 millimeter. Such dynamical adjustment of the beam spot diameter may further reduce the illumination of opaque pixels (and consequently reduce the heating of the liquid resin), while preserving the throughput for objects having larger cross-sectional dimensions.

Figure 5:
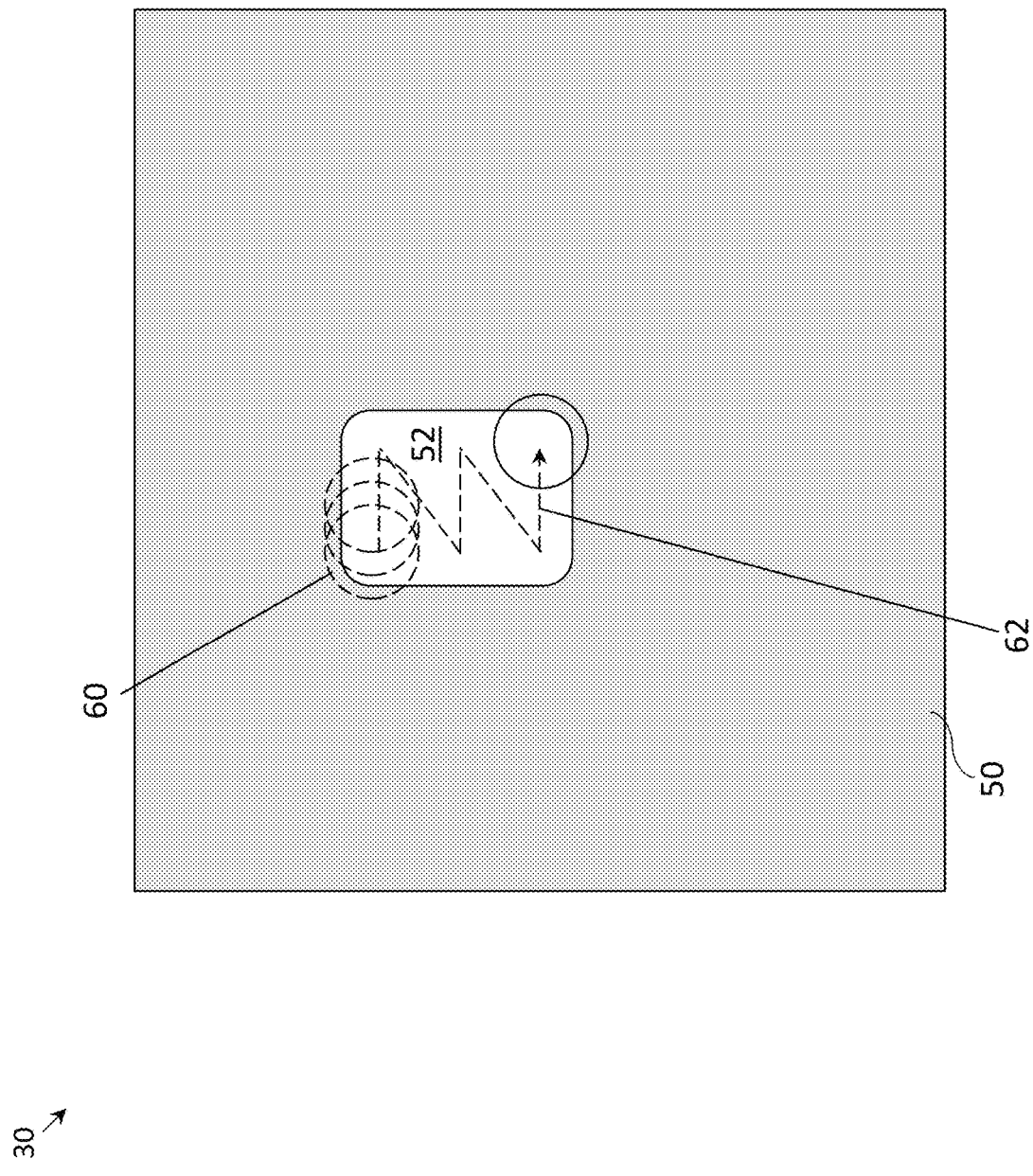
FIG. 5 depicts the beam path of a light beam performing a raster scan of a restricted region of the mask (depicted in FIG. 3A) with transparent pixels, in accordance with one embodiment of the invention.

FIG. 5 depicts beam path 62 of a light beam performing a raster scan of a transparent region 52 of mask 30. Beam spot 60 continuously travels (i.e., sweeps) across the surface of mask 30 along beam path 62. The beam path 62 may be determined by controller 36 based on the locations of the transparent pixels in mask 30 (i.e., beam path 62 is chosen to illuminate the transparent pixels of mask 30 in a uniform manner). It is understood that a thin border of opaque pixels surrounding transparent region 52 may also be illuminated, in order to allow for the possibility for some inaccuracy in the control of the location of beam spot 60 on mask 30, and also allowing for the possibility for some inaccuracy in the control of the beam spot diameter. However, the number of opaque pixels (e.g., in the thin border) that are illuminated may be minimized to minimize the heating of mask 30 by light beam 28. In a scenario where transparent pixels are concentrated in a single region (such as in the example of FIG. 5), it is possible that no more than 1% of the opaque pixels are illuminated by light beam 28 (during the printing of a single cross section of object 22). In a scenario where transparent pixels are concentrated in multiple regions (such as in the example of FIG. 8), it is possible that no more than 10% of the opaque pixels are illuminated (during the printing of a single cross section of object 22). It is understood that the beam spot of successive "rows" of the raster scan may overlap by a few pixels so as to allow for region 52 to be scanned with uniform light intensity (i.e., uniform intensity, as averaged out over time). Further, it is understood that the beam path 62 depicted in FIG. 5 may be traced out several times by light beam 28 (one time in the direction depicted in FIG. 5; the next time, following the path in the reverse direction; and then in the next time, following the direction depicted in FIG. 5, and so on). Repeatedly performing a fast scan of a region (e.g., performing 10 quick traversals through beam path 62) may be more optimal than performing a single slow scan of a region (e.g., perform a single traversal through beam path 62), as the heating of resin 18 may be spread out more uniformly across layer 34.

Figure 6:
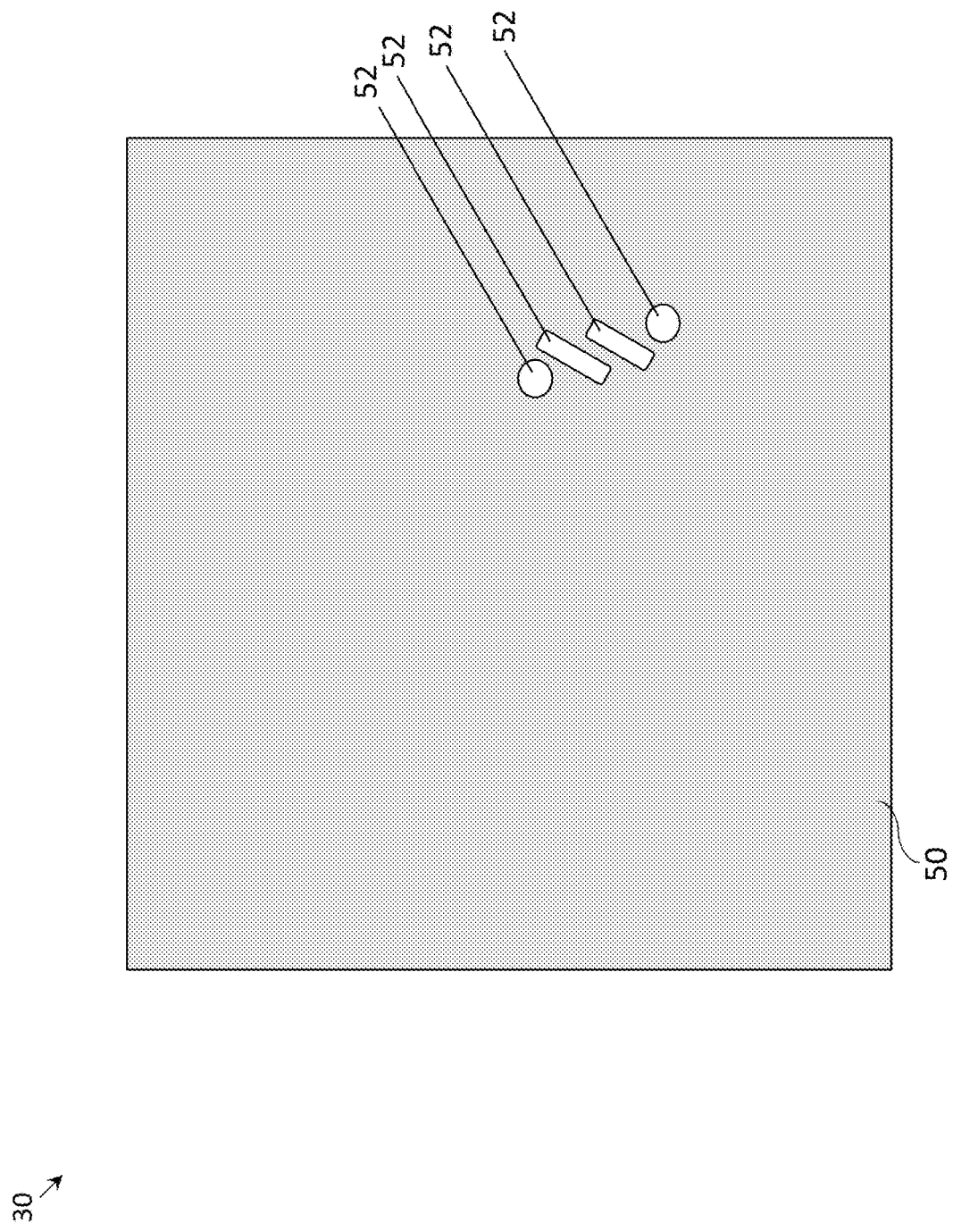
FIG. 6 depicts transparent and opaque regions of a mask, in accordance with one embodiment of the invention.
Figure 7:
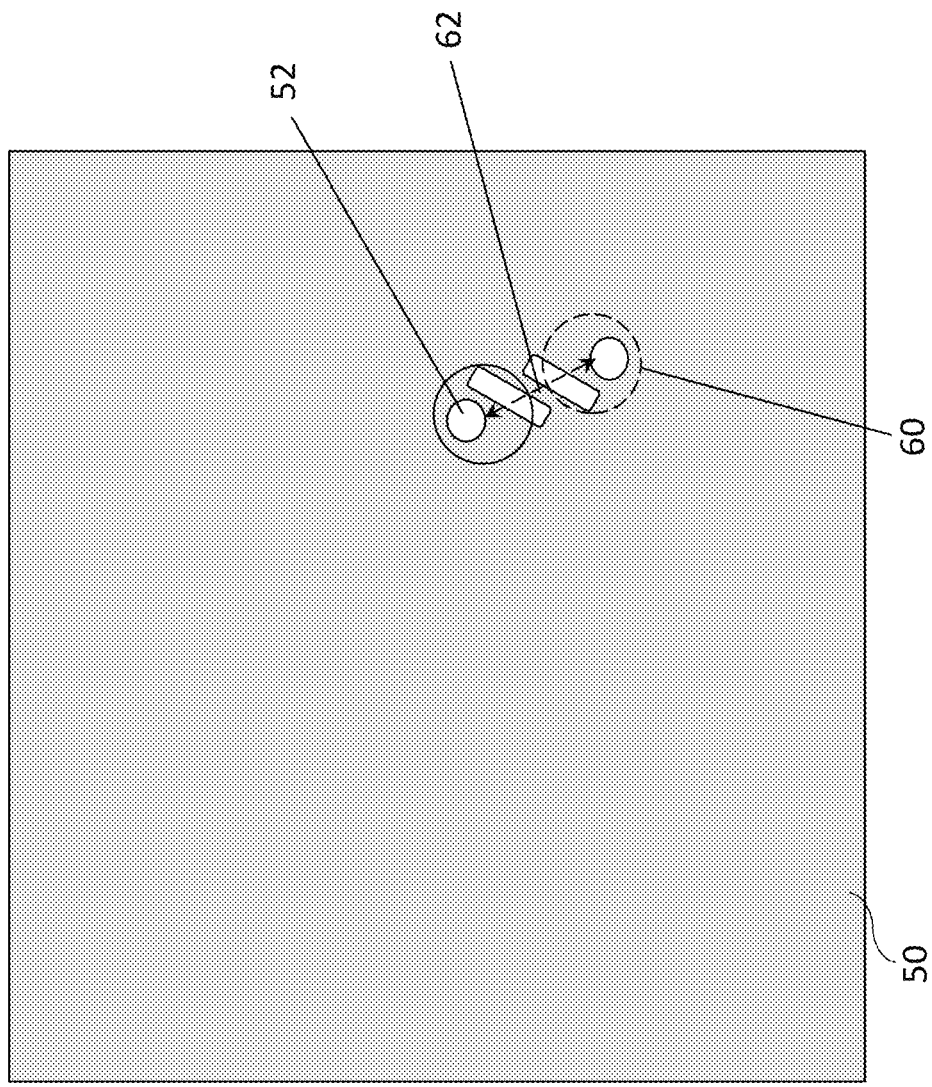
FIG. 7 depicts a back and forth scan of a restricted region of the mask (depicted in FIG. 6) with transparent pixels, in accordance with one embodiment of the invention.

FIG. 6 depicts opaque regions 50 and transparent regions 52 of mask 30, during another exposure time duration. In FIG. 6, the transparent regions 52 are arranged within a "thin strip" with width dimensions less than the diameter, d2, of the beam spot 60. Consequently, as shown in FIG. 7, light beam 28 may be repeatedly scanned in a "back and forth" manner along beam path 62 so as to illuminate transparent regions 52 of mask 30. During such scanning, it is understood that some opaque pixels in opaque region 50 may also be scanned by light beam 28 (i.e., when light beam 28 passes from one transparent region to another), but number of opaque pixels that are scanned is minimized to a large degree, as compared to the scenario in which the entire mask were raster scanned.

Figure 8:
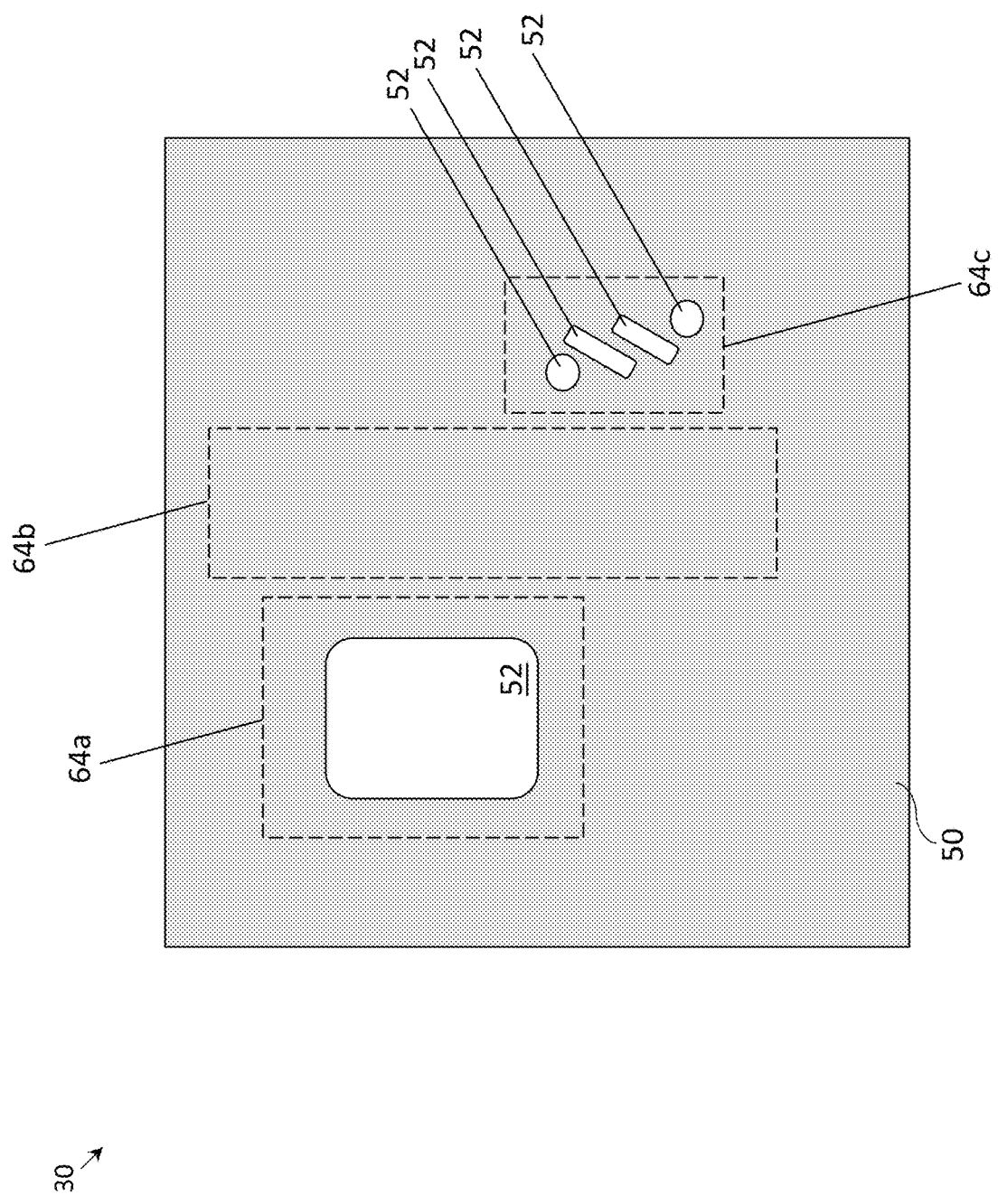
FIG. 8 depicts transparent and opaque regions of a mask, in accordance with one embodiment of the invention.
Figure 9:
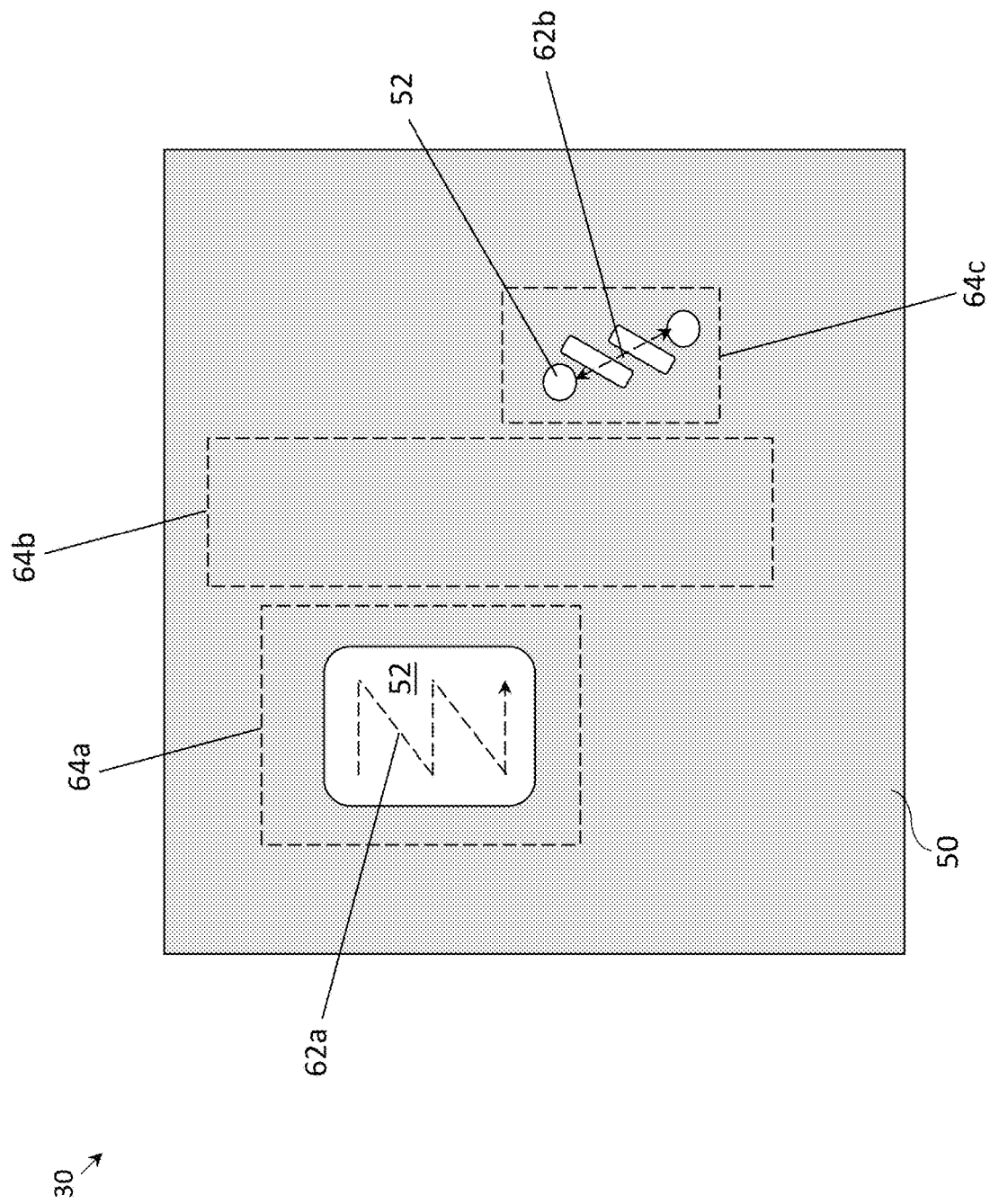
FIG. 9 depicts the beam path of a light beam scanning the mask of FIG. 8, in which the light beam repeatedly scans a first region and a second region with transparent pixels, in accordance with one embodiment of the invention.

FIG. 8 depicts opaque regions 50 and transparent regions 52 of mask 30, during another exposure time duration. In the example of FIG. 8, region 64a of mask 30 includes a high concentration of transparent pixels, likewise for region 64c, and region 64a is separated from region 64c by region 64b with only opaque pixels. FIG. 9 depicts the beam paths 62a, 62b that may be followed by light beam 28 to scan the transparent pixels of mask 30. In one scenario, light beam 28 may scan the transparent pixels within region 64a by repeatedly following beam path 62a. Beam scanner 26 may then reposition light beam 28 to region 64c without light beam 28 scanning region 64b with only opaque pixels. During the repositioning of light beam 28, controller 36 may turn off light source 24 or control a blocking element (not depicted) to block light beam 28. For instance, the blocking element may include a shutter of light source 24 that can be controlled by controller 36 to block light beam 28. After the repositioning, light beam 28 may scan the transparent pixels within region 64c by repeatedly following beam path 62b. It is noted that the scanning speed of laser beam 28 within region 64a may differ from the scanning speed of laser beam 28 within region 64c. For instance, smaller regions may be scanned at a slower speed than larger regions.

Figure 10:
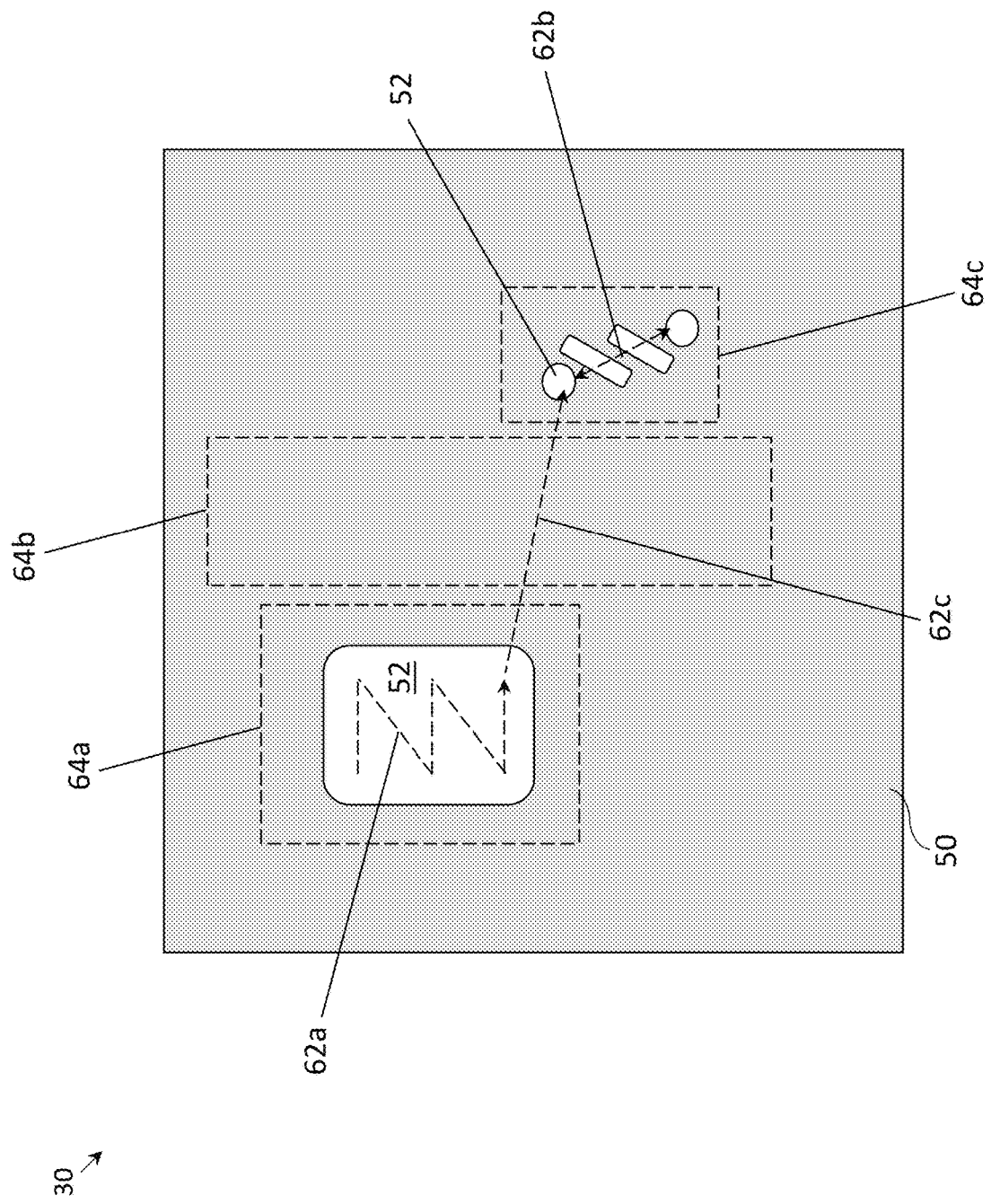
FIG. 10 depicts the beam path of a light beam scanning the mask of FIG. 8, in which the light beam repeatedly scans a first region and a second region with transparent pixels, and further scans a shortest path that connects a beam path in the first region with a beam path in the second region, in accordance with one embodiment of the invention.

FIG. 10 depicts a scanning scheme that minimizes the scanning of opaque pixels without the need to turn off light source 24 or block light beam 28. In the scanning scheme of FIG. 10, light beam 28 similarly scans the transparent pixels within region 64a by repeatedly following beam path 62a. However, during the repositioning of the light beam 28 from region 64a to 64c, light beam 28 scans along beam path 62c. Beam path 62c may be a shortest path through region 64b that connects beam path 62a within region 64a and beam path 62b within region 64c. After the repositioning, light beam 28 may scan the transparent pixels within region 64c by repeatedly following beam path 62b.

Figure 11:
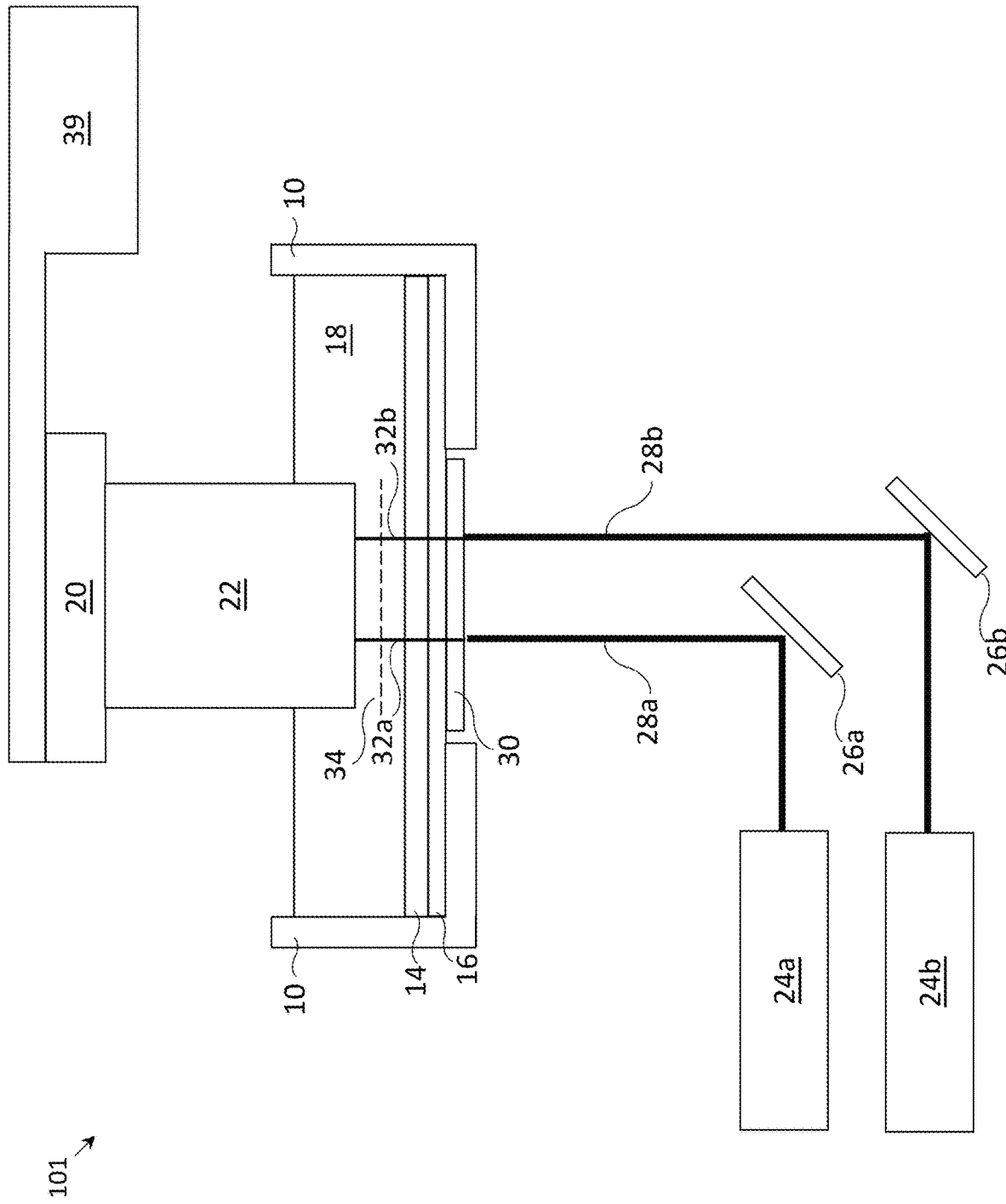
FIG. 11 depicts a 3D printing system with two light beams, each configured to scan a mask of the vat polymerization printer, in accordance with one embodiment of the invention.

FIG. 11 depicts a 3D printing system 101 that employs multiple light beams (e.g., two light beams) for scanning mask 30. Beam scanner 26a may scan light beam 28a from light source 24a selectively across certain regions of mask 30, and depending on whether the scanned pixels are transparent or opaque, filtered light beam 32a may be transmitted through mask 30 and cure a portion of resin in layer 34. Similarly, beam scanner 26b may scan light beam 28b from light source 24b selectively across other regions of mask 30, and depending on whether the scanned pixels are transparent or opaque, filtered light beam 32b may be transmitted through mask 30 and cure a portion of resin in layer 34. As an example, light beam 28a could follow beam path 62a in FIG. 10, and light beam 28b could follow beam path 62b in FIG. 10. While increasing the cost of 3D printing system 101, multiple light beams may provide for a faster throughput (i.e., printing speed) as compared a 3D printing system that employs a single light beam. For ease of depiction, controller 36 has not been illustrated in FIG. 11, but it should be apparent that controller 36 may be used to control beam scanner 26a and 26b and other previously described components of FIG. 11.

Figures 12A, 12B:
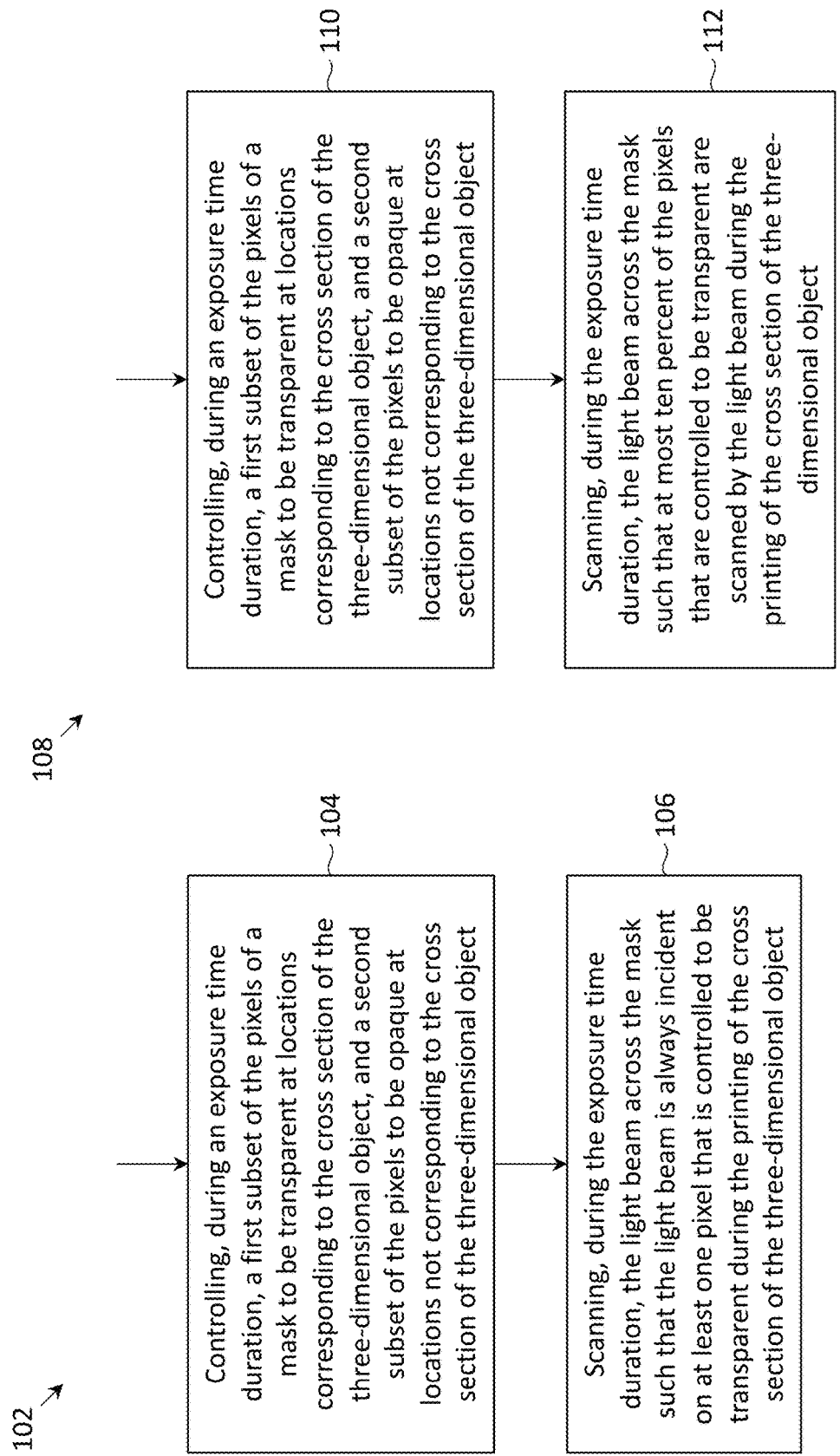
FIG. 12A depicts a flow chart of a method to print a cross section of a three-dimensional object with reduced heat generation, in accordance with one embodiment of the invention.
FIG. 12B depicts a flow chart of another method to print a cross section of a three-dimensional object with reduced heat generation, in accordance with one embodiment of the invention.

FIG. 12A depicts flow chart 102 of a method to print a cross section of a three-dimensional object with reduced heat generation. At step 104, controller 36 may control, during an exposure time duration, a first subset of the pixels to be transparent at locations corresponding to the cross section of a (to be printed) three-dimensional object, and a second subset of the pixels to be opaque at locations not corresponding to the cross section of the three-dimensional object. At step 106, controller 36 may control beam scanner 26, during the same exposure time duration as step 104, to scan light beam 28 across at least one region of the mask having at least some pixels that are controlled to be transparent. The scanning may be performed such that light beam 28 is always incident on at least one of the pixels of mask 30 that is controlled to be transparent during the printing of the cross section of the three-dimensional object. Such a scanning scheme was illustrated in FIGS. 5, 7 and 9. The heat reduction, of course, is most pronounced when the transparent pixels only account for a small (or smaller) portion of the total number of pixels (e.g., less than 30%-50% of the total number of pixels).

FIG. 12B depicts flow chart 108 of another method to print a cross section of a three-dimensional object with reduced heat generation. At step 110, controller 36 may control, during an exposure time duration, a first subset of the pixels to be transparent at locations corresponding to the cross section of a (to be printed) three-dimensional object, and a second subset of the pixels to be opaque at locations not corresponding to the cross section of the three-dimensional object. At step 112, controller 36 may control beam scanner 26, during the same exposure time duration as step 110, to scan light beam 28 across at least one region of the mask having at least some pixels that are controlled to be transparent. The scanning may be performed such that at most ten percent of the pixels that are controlled to be opaque are scanned by light beam 28 during the printing of the cross section of the three-dimensional object. Such a scanning scheme was illustrated in FIGS. 5, 7, 9 and 10. Again, the heat reduction is most pronounced when the transparent pixels only account for a small (or smaller) portion of the total number of pixels (e.g., less than 30%-50% of the total number of pixels).

FIG. 13A depicts flow chart 200 of a method to scan light beam 28 across a surface of a mask of a 3D printing system. At step 202, light beam 28 may be repeatedly scanned across a first region of mask 30 that includes at least some transparent pixels. Step 202 was described above by the scanning of transparent pixels within region 64a in FIG. 9. At step 204, light beam 28 may be repositioned from the first region to a third region of the mask that includes at least some transparent pixels, without scanning a second region of the mask that separates the first region from the third region, the second region of the mask including only opaque pixels. Step 204 was described above in FIG. 9 in the repositioning of light beam 28 from region 64a to region 64c. At step 206, light beam 28 may be repeatedly scanned across the third region of the mask that includes at least some transparent pixels. Step 206 was described above by the scanning of transparent pixels within region 64c in FIG. 9.

FIG. 13B depicts flow chart 208 of a method to scan light beam 28 across a surface of a mask of a 3D printing system. At step 210, light beam 28 may be repeatedly scanned across a first region of mask 30 that includes at least some transparent pixels. Step 210 was described above by the scanning of transparent pixels within region 64a in FIG. 10. At step 212, light beam 28 may be scanned along a path within a second region that separates the first region from a third region, the second region including only opaque pixels, and the third region including at least some transparent pixels, the path being a shortest path that connects a beam path in the first region and a beam path in the third region. Step 212 was described above in FIG. 10 by the scanning of light beam 28 along beam path 62c. At step 214, light beam 28 may be repeatedly scanned across the third region of the mask that includes at least some transparent pixels. Step 214 was described above by the scanning of transparent pixels within region 64c in FIG. 10.

In practice, there may be some non-uniformity in the light transmissivity across respective pixels of the mask (e.g., more than 10% variation across the pixels). For example, even if a pixel is controlled to be (fully) transparent, it may only be 95% transparent to light due to defects, aging of the pixel, etc. Therefore, for the sake of clarity, it is noted that the above-mentioned "transparent pixel" may refer to a pixel that is 100% transparent to light, 99% transparent to light, 95% transparent to light, etc. Likewise, the above-mentioned "opaque pixel" may refer to a pixel that is 100% opaque to light, 99% opaque to light, 95% opaque to light, etc.

FIG. 14 depicts flow chart 250 of a method for printing a cross section of a three dimensional object that includes scanning light beam 28 across a surface of a mask of a 3D printing system in such a way that the scanning compensates for the non-uniformity in the light transmissivity across respective pixels of the mask. At step 252, a uniformity in a light transmissivity across respective pixels of the mask may be assessed. Such an assessment may comprise controlling all pixels to be (fully) transparent, illuminating the entire mask (e.g., scanning a light beam across the entire mask), and measuring the intensity of the light transmitted by each of the pixels. During this initial assessment, it is assumed that the light intensity of the light beam itself is fairly uniform, regardless of whether the light beam is shining near the central region or the peripheral regions of the mask. The respective locations of any pixels with a less-than-expected light intensity may be identified (e.g., an attenuated light intensity relative to other pixel elements).

At step 254, controller 36 may control, during an exposure time duration, a first subset of the pixels to be transparent at locations corresponding to the cross section of a (to be printed) three-dimensional object, and a second subset of the pixels to be opaque at locations not corresponding to the cross section of the three-dimensional object. At step 256, controller 36 may control beam scanner 26, during the same exposure time duration as step 104, to scan light beam 28 across at least one region of the mask having at least some pixels that are controlled to be transparent. The scanning may be performed in a manner that compensates for the non-uniformity in the light transmission across respective pixels in the at least one region of the mask. The compensation may include: (i) varying a light intensity of the light beam while the light beam is scanned over the at least one region, (ii) varying a scan speed of the light beam while the light beam is scanned over the at least one region, or (iii) varying a number of times the light beam is repeatedly scanned over the at least one region. More specifically, for those regions where the pixels are known (via the assessment in step 252) to output an attenuated light output, the light intensity of the light beam may be increased, the scanning speed of the light beam may be decreased and/or the number of scanning passes through those regions may be increased so as to compensate for the attenuated light output.

Figure 15:
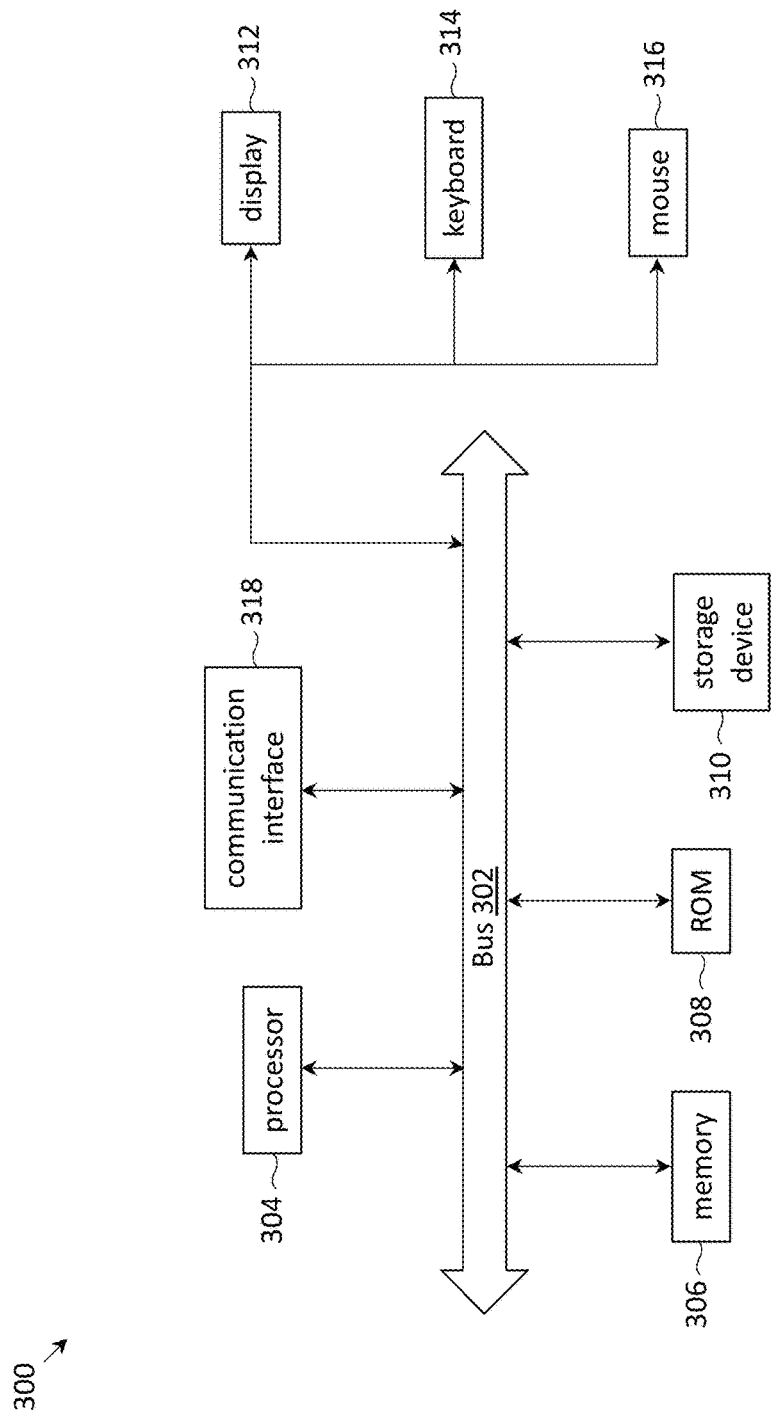
FIG. 15 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 15 provides an example of system 300 that may be representative of any of the computing systems (e.g., controller 36) discussed herein. Note, not all of the various computer systems have all of the features of system 300. For example, certain ones of the computer systems discussed above may not include a display inasmuch as the display function may be provided by a client computer communicatively coupled to the computer system or a display function may be unnecessary. Such details are not critical to the present invention.

System 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, for example a hard disk, flash memory-based storage medium, or other storage medium from which processor 304 can read, is provided and coupled to the bus 302 for storing information and instructions (e.g., operating systems, applications programs and the like).

Computer system 300 may be coupled via the bus 302 to a display 312, such as a flat panel display, for displaying information to a computer user. An input device 314, such as a keyboard including alphanumeric and other keys, may be coupled to the bus 302 for communicating information and command selections to the processor 304. Another type of user input device is cursor control device 316, such as a mouse, a trackpad, or similar input device for communicating direction information and command selections to processor 304 and for controlling cursor movement on the display 312. Other user interface devices, such as microphones, speakers, etc. are not shown in detail but may be involved with the receipt of user input and/or presentation of output.

The processes referred to herein may be implemented by processor 304 executing appropriate sequences of computer-readable instructions contained in main memory 306. Such instructions may be read into main memory 306 from another computer-readable medium, such as storage device 310, and execution of the sequences of instructions contained in the main memory 306 causes the processor 304 to perform the associated actions. In alternative embodiments, hard-wired circuitry or firmware-controlled processing units may be used in place of or in combination with processor 304 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 300 or similar electronic computing device, that manipulates and transforms data represented as physical (electronic) quantities within its registers and memories into other data similarly represented as physical quantities within its memories or registers or other such information storage, transmission or display devices.

Computer system 300 also includes a communication interface 318 coupled to the bus 302. Communication interface 318 may provide a two-way data communication channel with a computer network, which provides connectivity to and among the various computer systems discussed above. For example, communication interface 318 may be a local area network (LAN) card to provide a data communication connection to a compatible LAN, which itself is communicatively coupled to the Internet through one or more Internet service provider networks. The precise details of such communication paths are not critical to the present invention. What is important is that computer system 300 can send and receive messages and data through the communication interface 318 and in that way communicate with hosts accessible via the Internet.

Thus, methods and systems for photocuring liquid resin with reduced heat generation has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for printing a cross section of a three-dimensional object in a photocuring region of a vat polymerization printer that includes (i) a tank configured for containing a photo-curable liquid resin, (ii) a flexible membrane defining a bottom boundary of the photocuring region, (iii) a light source configured to emit a light beam, (iv) a beam scanner configured to scan the light beam, and (v) a mask disposed between the beam scanner and the flexible membrane and having pixels configurable to be individually transparent or opaque to portions of the light beam, wherein a diameter of a cross section of the light beam is greater than a cross-sectional dimension of each of the respective pixels, the method comprising:
   controlling, during an exposure time duration, a first subset of the pixels to be transparent at locations corresponding to the cross section of the three-dimensional object, and a second subset of the pixels to be opaque at locations not corresponding to the cross section of the three-dimensional object; and
   scanning, during the exposure time duration, the light beam across at least one region of the mask having at least some pixels that are controlled to be transparent and into the photocuring region, wherein at most ten percent of the pixels that are controlled to be opaque are scanned by the light beam during the printing of the cross section of the three-dimensional object,
   wherein, during the exposure time duration, and as a result of the control of the first and second subset of the pixels, (i) a first region of the mask includes at least some pixels that are controlled to be transparent, the first region of the mask being surrounded by a first border with pixels that are controlled to be opaque, (ii) a second region of the mask includes only pixels that are controlled to be opaque, and (iii) a third region of the mask includes at least some pixels that are controlled to be transparent, and
   wherein the scanning of the light beam comprises repeatedly scanning the light beam across the first region of the mask and into the photocuring region through pixels of the first region that are controlled to be transparent, repositioning the light beam from the first region of the mask to the third region of the mask without scanning the second region of the mask, and repeatedly scanning the light beam across the third region of the mask and into the photocuring region through pixels of the third region that are controlled to be transparent,
   wherein the first border is illuminated by the light beam.

2. The method of claim 1, wherein repeatedly scanning the light beam across the first region of the mask comprises at least one of a raster scan or a back and forth scan of the first region of the mask, and wherein repeatedly scanning the light beam across the third region of the mask comprises at least one of a raster scan or a back and forth scan of the third region of the mask.

3. The method of claim 1, wherein, during the exposure time duration, a total number of pixels in the first subset of the pixels is less than a total number of pixels in the second subset of the pixels.

* * * * *